United States Patent
Vaccaro

(10) Patent No.: US 12,510,622 B2
(45) Date of Patent: Dec. 30, 2025

(54) JOINT MAXIMUM LIKELIHOOD MULTIPLE EMITTER LOCATION ESTIMATION

(71) Applicant: BAE SYSTEMS Information and Electronic Systems Integration Inc., Nashua, NH (US)

(72) Inventor: Thomas R. Vaccaro, Hudson, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 378 days.

(21) Appl. No.: 18/299,931

(22) Filed: Apr. 13, 2023

(65) Prior Publication Data

US 2024/0345202 A1    Oct. 17, 2024

(51) Int. Cl.
G01S 5/02    (2010.01)

(52) U.S. Cl.
CPC .......... *G01S 5/0278* (2013.01); *G01S 5/0289* (2013.01); *G01S 5/0294* (2013.01)

(58) Field of Classification Search
None
See application file for complete search history.

(56) References Cited

U.S. PATENT DOCUMENTS

| | | |
|---|---|---|
| 7,986,271 B2 | 7/2011 | Kelly |
| 8,134,493 B2 | 3/2012 | Noble et al. |
| 8,188,919 B2 | 5/2012 | Grabbe et al. |
| 8,723,730 B2 | 5/2014 | Lu et al. |
| 8,963,771 B1 | 2/2015 | Schiffmiller |
| 9,176,218 B1 | 11/2015 | Fehling et al. |
| 10,345,428 B1 | 7/2019 | Oden |

(Continued)

FOREIGN PATENT DOCUMENTS

| | | |
|---|---|---|
| EP | 3146356 A2 | 3/2017 |
| WO | WO2016083769 A1 | 6/2016 |

(Continued)

OTHER PUBLICATIONS

Gavish, M. and A.J. Weiss. "Performance Analysis of Bearing-Only Target Location Algorithms." IEEE Transactions on Aerospace and Electronic Systems, vol. 28, No. 3, Jul. 1992, pp. 817-828.

*Primary Examiner* — Whitney Moore
(74) *Attorney, Agent, or Firm* — Gary McFaline

(57) ABSTRACT

Techniques for jointly estimating geolocations of a plurality of emitting targets. An example method includes acquiring a plurality of bearing measurements, establishing a search grid based on the bearing measurements, performing a joint maximum likelihood optimization procedure on the bearing measurements over the search grid to produce an estimated geolocation solution by solving a nonlinear multi-target geolocation description function for all targets associated with a current rank, repeating the joint maximum likelihood optimization procedure set successive ranks until a maximum rank is reached, evaluating the estimated geolocation solution sets for each rank to determine a number of targets, based on the number of targets, selecting the corresponding geolocation solution set for the rank corresponding to the number of targets, and processing the selected corresponding geolocation solution set to produce a geolocation result that includes an estimated location of each target.

20 Claims, 10 Drawing Sheets

(56) References Cited

U.S. PATENT DOCUMENTS

| | | |
|---|---|---|
| 10,371,787 B2 | 8/2019 | Gudim et al. |
| 10,698,077 B2 | 6/2020 | Oden |
| 10,830,865 B1 | 11/2020 | Schiffmiller |
| 2014/0270369 A1* | 9/2014 | Guisewite .............. G01C 11/04 382/103 |

FOREIGN PATENT DOCUMENTS

| | | |
|---|---|---|
| WO | WO2020074071 A1 | 4/2020 |
| WO | WO2022125091 A1 | 6/2022 |

* cited by examiner

JOINT MAXIMUM LIKELIHOOD MULTIPLE EMITTER LOCATION ESTIMATION

STATEMENT OF GOVERNMENT INTEREST

This invention was made with United States Government assistance under Contract No. 4100997388 (LRASM), awarded by DARPA. The United States Government has certain rights in this invention.

FIELD OF DISCLOSURE

The present disclosure relates to systems and methods for locating and tracking targets, and more particularly, to geolocation techniques for acquiring multiple targets.

BACKGROUND

There are numerous applications in which it is necessary to acquire and track one or more moving targets that include one or more radio frequency (RF) emitters, or more generally, emitting sources. There are several existing approaches to estimating the position of an emitting source from passive angle of arrival measurements (lines of bearing). Bearing measurements collected by direction finding (DF) sensors can be intersected to determine the location of the emitter. Since the bearing measurements are noisy, statistical algorithms are used to obtain an estimated position of the emitter.

In the case of a single target/emitter and assuming lines of bearing (LOBs) measurements with additive white Gaussian noise (AWGN) error, the geolocation likelihood problem (estimate of the target's location) can be described by a non-linear least squares cost function, and as such, can be solved in a variety of ways. One approach used in a maximum likelihood (ML) estimator is to apply Gauss-Newton iterations, which uses derivatives of the cost function. A seed location is used to start the iterative solution process, and the accuracy of the resulting geolocation estimate is scenario-dependent. Another approach is to apply the well-known Stansfield algorithm, which reduces the non-linear geolocation cost likelihood problem to a linear least squares problem by using the cost function approximation that $f_n \approx \sin f_n$. The Stansfield approach can be viewed as a small error approximation of a more generalized maximum likelihood (ML) estimator. The use of the approximation $f_n \approx \sin f_n$ in the Stansfield approach leads to a bias in the geolocation result (knows as the Stansfield bias). This bias error is significant for certain collection profiles. Further, as noted above, both the ML estimator and the Stansfield approach are single target geolocation solutions. Accordingly, although the problem of determining geolocations based on bearing only measurements has been long studied, non-trivial issues remain with respect to providing accurate geolocation results for multiple targets, particularly under challenging conditions.

SUMMARY

Aspects and embodiments are directed to geolocation techniques for acquiring multiple targets under conditions where the number of targets may be unknown and the targets may be moving or stationary.

According to one embodiment, a method of estimating geolocations of a plurality of targets comprises receiving, via a signal receiver, a plurality of bearing measurements, individual bearing measurements representing a respective line of bearing between the signal receiver and a respective target of the plurality of targets, establishing a search grid based at least in part on the plurality of bearing measurements, and successively for each rank of a plurality of ranks, performing a joint maximum likelihood optimization procedure on the plurality of bearing measurements over the search grid to produce a corresponding geolocation solution set for the rank, such that, after performing the joint maximum likelihood optimization procedure for the plurality of ranks, a plurality of geolocation solutions sets is produced, wherein each rank corresponds to a current estimated number of targets in the plurality of targets, and wherein performing the joint maximum likelihood optimization procedure includes solving a nonlinear multi-target geolocation description function for the estimated number of targets associated with the rank. The method further comprises evaluating the plurality of geolocation solution sets to estimate a true number of targets in the plurality of targets, based on the estimated true number of targets, selecting the corresponding geolocation solution set for the rank corresponding to the estimated true number of targets, and processing the selected corresponding geolocation solution set to produce a geolocation result that includes an estimated location of each target in the estimated true number of targets.

In one example, performing the joint maximum likelihood optimization procedure includes applying an expectation maximization process to solve the nonlinear multi-target geolocation description function. In another example, applying the expectation maximization process includes applying a multi-survivor optimization process wherein at least two candidate solutions to the nonlinear multi-target geolocation description function are propagated from the rank into a next rank.

In one example, performing the joint maximum likelihood optimization procedure includes, prior to solving the nonlinear multi-target geolocation description function, determining a plurality of seed points by applying a line of bearing walk function to the plurality of bearing measurements, and seeding the search grid with the plurality of seed points.

In another example, performing the joint maximum likelihood optimization procedure includes computing association probabilities for each bearing measurement in the plurality of bearing measurements, each association probability representing probabilities of the bearing measurement being associated with individual targets of the current estimated number of targets. In one example, performing the joint maximum likelihood optimization procedure further includes estimating the location of each target of the current estimated number of targets using a weighted least squares process, wherein weights used in the weighted least squares process correspond to a combination of the association probabilities and accuracy estimators for each bearing measurement.

In another example, receiving the plurality of bearing measurements includes moving the signal receiver along a trajectory, and receiving, via the signal receiver, the plurality of bearing measurements at different collection points along the trajectory over time.

According to another embodiment, a target acquisition system comprises at least one signal receiver configured to collect a plurality of bearing measurements over a batch collection interval, individual bearing measurements of the plurality of bearing measurements representing a respective line of bearing between the at least one signal receiver and a target, at least one processor, and a data storage storing a plurality of instructions that when executed by the at least one processor configure the target acquisition system to perform a joint maximum likelihood target location estimation process. The process includes establishing a search grid based on the plurality of bearing measurements, successively for each rank of a plurality of ranks, performing a joint maximum likelihood optimization procedure on the plurality of bearing measurements over the search grid to produce a corresponding geolocation solution set for the rank, such that, after performing the joint maximum likelihood optimization procedure for the plurality of ranks, a plurality of geolocation solutions sets is produced, wherein each rank corresponds to a current estimated number of targets in the plurality of targets, and wherein performing the joint maximum likelihood optimization procedure includes solving a nonlinear multi-target geolocation description function for the estimated number of targets associated with the rank. The process further includes evaluating, based on a scoring function, the plurality of geolocation solution sets to estimate a true number of targets in the plurality of targets, based on the estimated true number of targets, selecting the corresponding geolocation solution set for the rank corresponding to the estimated true number of targets, and processing the selected corresponding geolocation solution set to produce a geolocation result that includes an estimated location of each target in the estimated true number of targets of targets.

In one example, the target acquisition system further comprises a display device configured to display the geolocation result.

In another example, to perform the joint maximum likelihood optimization procedure, the data storage further includes instructions that when executed by the at least one processor configure the target acquisition system to apply an expectation maximization process to solve the nonlinear multi-target geolocation description function. In one example, to apply the expectation maximization process, the data storage further includes instructions that when executed by the at least one processor configure the target acquisition system to apply a multi-survivor optimization process wherein at least two candidate solutions to the nonlinear multi-target geolocation description function are propagated from the rank into a next rank.

In another example, to perform the joint maximum likelihood optimization procedure, the data storage further includes instructions that when executed by the at least one processor configure the target acquisition system to compute association probabilities for each bearing measurement in the plurality of bearing measurements, each association probability representing probabilities of the bearing measurement being associated with individual targets of the current estimated number of targets. In one example, to perform the joint maximum likelihood optimization procedure, the data storage further includes instructions that when executed by the at least one processor configure the target acquisition system to estimate the location of each target of the current estimated number of targets using a weighted least squares process, wherein weights used in the weighted least squares process correspond to a combination of the association probabilities and accuracy estimators for each bearing measurement.

In another example, to perform the joint maximum likelihood optimization procedure, the data storage further includes instructions that when executed by the at least one processor configure the target acquisition system to, prior to solving the nonlinear multi-target geolocation description function, determine a plurality of seed points by applying a line of bearing walk function to the plurality of bearing measurements, and seed the search grid with the plurality of seed points.

In another example, the at least one signal receiver is configured to move along a trajectory over time and to collect the plurality of bearing measurements from different collection points along the trajectory.

Another embodiment is directed to a computer program product including one or more machine-readable media encoded with instructions that when executed by one or more processors cause a process to be carried out for estimating geolocations of a plurality of targets. The process comprises receiving, via a signal receiver, a plurality of bearing measurements, individual bearing measurements representing a respective line of bearing between the signal receiver and a respective target of the plurality of targets, establishing a search grid based at least in part on the plurality of bearing measurements, and successively for each rank of a plurality of ranks, performing a joint maximum likelihood optimization procedure on the plurality of bearing measurements over the search grid to produce a corresponding geolocation solution set for the rank, such that, after performing the joint maximum likelihood optimization procedure for the plurality of ranks, a plurality of geolocation solutions sets is produced, wherein each rank corresponds to a current estimated number of targets in the plurality of targets, and wherein performing the joint maximum likelihood optimization procedure includes solving a nonlinear multi-target geolocation description function for the current estimated number of targets. The process further comprises evaluating, based on a scoring function, the plurality of geolocation solution sets to estimate a true number of targets in the plurality of targets, based on the estimated true number of targets, selecting the corresponding geolocation solution set for the rank corresponding to the estimated true number of targets, and processing the selected corresponding geolocation solution set to produce a geolocation result that includes an estimated location of each target in the estimated true number of targets.

In one example, performing the joint maximum likelihood optimization procedure includes applying an expectation maximization process to solve the nonlinear multi-target geolocation description function.

In another example, performing the joint maximum likelihood optimization procedure includes, for each rank greater than one, computing association probabilities for each bearing measurement in the plurality of bearing measurements, each association probability representing probabilities of the bearing measurement being associated with respective individual targets of the current estimated number of targets, estimating the location of each target of the current estimated number of targets using a weighted least squares process, wherein weights used in the weighted least squares process correspond to a combination of the association probabilities and accuracy estimators for each bearing measurement, and seeding the search grid using the estimated location of each target of the current estimated number of targets.

In one example, performing the joint maximum likelihood optimization procedure includes, prior to solving the nonlinear multi-target geolocation description function, determining a plurality of seed points by applying a line of bearing walk function to the plurality of bearing measurements, and seeding the search grid with the plurality of seed points.

In another example, applying an expectation maximization process includes applying a multi-survivor optimization process wherein at least two candidate solutions to the nonlinear multi-target geolocation description function are propagated from the rank into a next rank.

Still other aspects, embodiments, and advantages of these example aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

Figure 1:
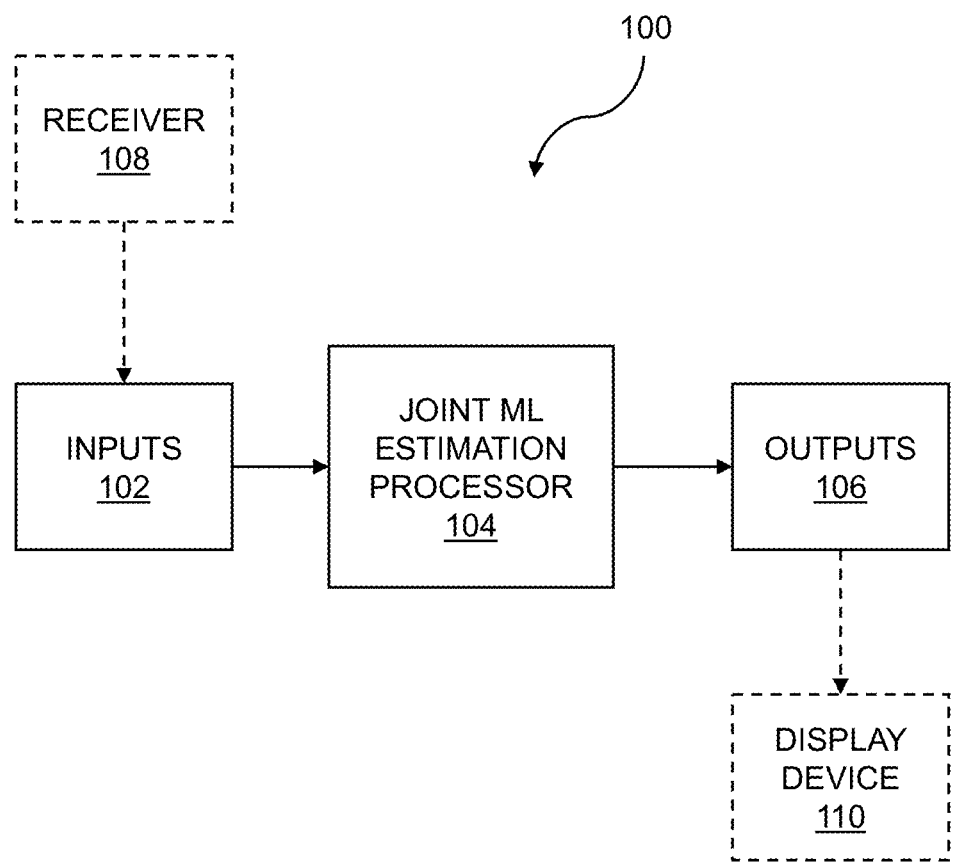
FIG. 1 is a block diagram of an example system for implementing a joint maximum likelihood multiple target location estimation process, in accordance with aspects of the present disclosure.

Although the following detailed description will proceed with reference being made to illustrative embodiments, many alternatives, modifications, and variations thereof will be apparent in light of this disclosure.

DETAILED DESCRIPTION

Techniques are disclosed for implementing geolocation processes to acquire and track targets of interest. A given target of interest may be, for example, any target including an internal emitting source (e.g., RF source) that can be received via a signal receiver, or any target that can be illuminated with an external emitting source and reflect signal of that external source to the signal receiver. The techniques may be implemented, for example, via a method that comprises receiving, via a signal receiver, a plurality of bearing measurements, individual bearing measurements representing respective lines of bearing between the signal receiver and a respective target of the plurality of targets, establishing a search grid based at least in part on the plurality of bearing measurements, and successively for each rank of a plurality of ranks, performing a joint maximum likelihood optimization procedure on the plurality of bearing measurements over the search grid to produce a corresponding geolocation solution set for the rank, such that, after performing the joint maximum likelihood optimization procedure for the plurality of ranks, a plurality of geolocation solutions sets is produced, wherein each rank corresponds to a current estimated number of targets in the plurality of targets, and wherein performing the joint maximum likelihood optimization procedure includes solving a nonlinear multi-target geolocation description function for all targets associated with the rank simultaneously. The method further comprises evaluating the plurality of geolocation solution sets to determine a true number of targets in the plurality of targets, based on the true number of targets, selecting the corresponding geolocation solution set for the rank corresponding to the true number of targets, and processing the selected corresponding geolocation solution set to produce a geolocation result that includes an estimated location of each target in the plurality of targets.

General Overview

As discussed above, non-trivial issues remain with respect to providing accurate geolocation results based on bearing only measurements. This is particularly the case in situations where the line of bearing (LOB) measurements are taken from a single moving collection platform, the targets are closely spaced relative to the accuracy of the line of bearing (LOB) measurements, and the RF emissions from the targets do not have parameters that enable the source to be identified (e.g., embedded identifiers obtained from demodulation of the waveform, or external characteristics time of transmission/frequency of transmission, or other characteristics that allows discrimination of one emitter from another). In such situations, obtaining geolocation estimates involves separating the emitters by solving a multiple emitter location problem, and thereby determining that there are multiple unique emitting locations, and thus multiple emitters. However, as discussed above, conventional ML estimators and the Stansfield approach are single-target geolocation solutions, and as such, face significant limitations in the case of multiple emitters.

To address these issues, aspects and embodiments disclosed herein provide techniques that can be applied to solve for multiple target locations simultaneously through a joint maximum likelihood optimization procedure. The procedure is applied to a dataset that includes line of bearing measurements between the collector (signal receiver) and the emitters/targets. As discussed in more detail below, optimizing the solution space jointly for all targets simultaneously offers improved resolution compared to existing optimization methods that optimize the dataset for each estimated target individually. For example, the techniques disclosed herein may allow a system to separate or otherwise distinguish and geolocate closely spaced emitters with greater accuracy and reliability than existing methods. The emitters can either be static or moving targets, or a combination thereof.

Example Target Geolocation System

FIG. 1 is a block diagram of an example target acquisition system 100 for implementing multiple target geolocation processes in accordance with aspects of the present disclosure. The system 100 includes joint maximum likelihood (ML) estimation processor 104 configured to receive inputs 102 and to produce outputs 106. In some examples, the inputs 102 represent signals received via a signal receiver 108 (e.g., an electronic device for accepting signals and converting the signals into data). In examples, the signals 102 represent lines of bearing (LOBs) to emitters. In some examples, the inputs 202 may also include error or noise associated with the lines of bearing. The outputs 106 may represent estimated emitter geolocations. In some examples, the outputs 106 (optionally after further processing) are provided to a display device 110 (e.g., a monitor or printer) in a human readable format.

As discussed in more detail below, the joint ML estimation processor 104 applies the geolocation estimation processes disclosed herein to the inputs 102 to produce estimates of the target model, that is, the number of emitters producing the inputs 202 and probable locations in space (geolocations) of the emitters. These estimates may be provided as the outputs 106. In various examples, the joint ML estimation processor 104 is configured to perform the various processes and functions such as described herein and with respect to FIGS. 2-8.

The processor 104 can be any suitable processor and may include one or more coprocessors or controllers. In some embodiments, the processor 104 can be implemented as any number of processor cores. The processor 104 (or processor cores) can be any type of processor, such as, for example, a micro-processor, an embedded processor, a digital signal processor (DSP), a graphics processor (GPU), a network processor, a field programmable gate array or other device configured to execute code. The processor 104 can include multithreaded cores in that they may include more than one hardware thread context (or "logical processor") per core. The processor 104 can be implemented as a complex instruction set computer (CISC) or a reduced instruction set computer (RISC) processor.

The processor 104 can be configured to execute an operating system (OS), such as Google Android (by Google Inc. of Mountain View, Calif.), Microsoft Windows (by Microsoft Corp. of Redmond, Wash.), Apple OS X (by Apple Inc. of Cupertino, Calif.), Linux, or a real-time operating system (RTOS). As will be appreciated in light of this disclosure, the techniques provided herein can be implemented without regard to the particular operating system provided in conjunction with the system 100, and therefore may also be implemented using any suitable existing systems or platforms. It will be appreciated that in some embodiments, some of the various components of the system 100 can be combined or integrated in a system-on-a-chip (SoC) architecture. In some embodiments, the components may be hardware components, firmware components, software components or any suitable combination of hardware, firmware or software.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

Other componentry and functionality not reflected in FIG. 1 will be apparent in light of this disclosure, and it will be appreciated that other embodiments are not limited to any particular hardware configuration.

Maximum Likelihood Location Estimation

Figure 2:
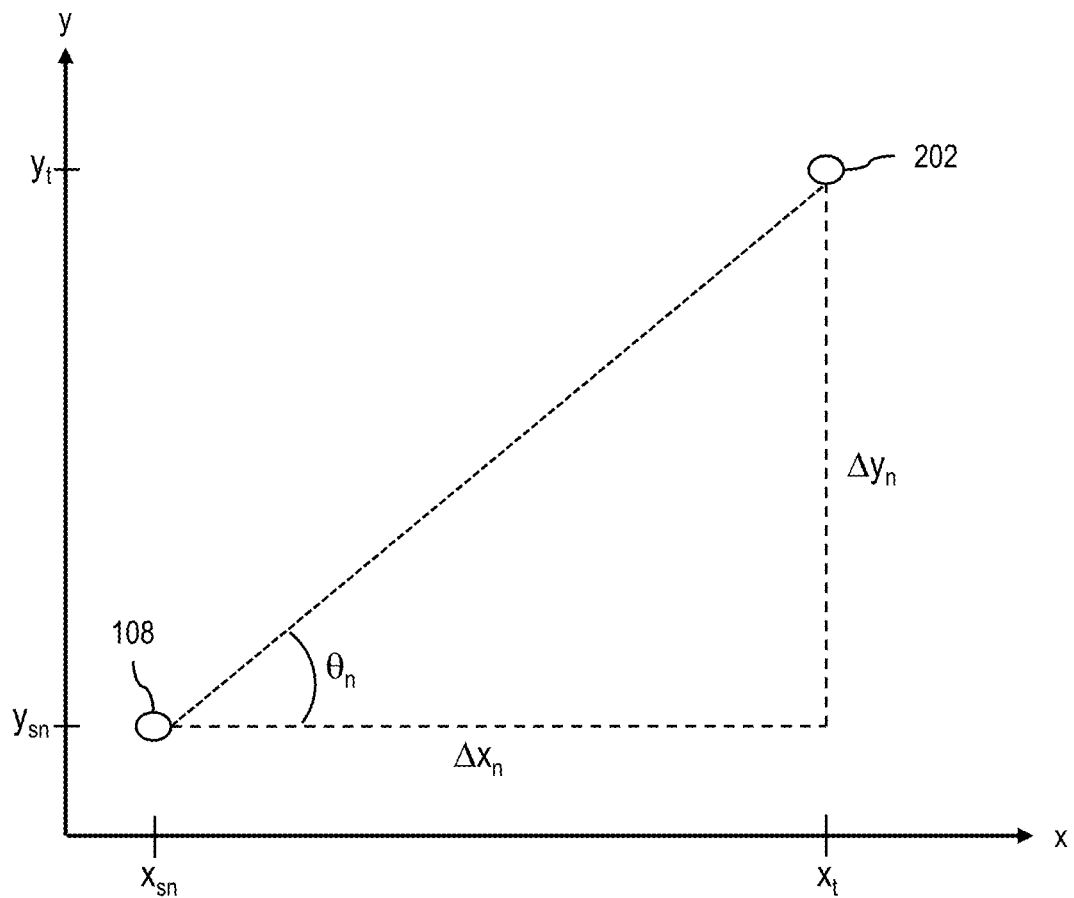
FIG. 2 is a diagram illustrating a geometry for an example of a two-dimensional bearing only approach to position estimation in accordance with aspects of the present disclosure.

Referring to FIG. 2, there is illustrated a geometry reference diagram for a two-dimensional bearing only approach to position estimation of a target 202. The target coordinates vector is represented by:

$$x = (x_t, y_t)^T \qquad (1)$$

and is to be estimated from target bearing measurements:

$$\Theta = (\theta_1, \theta_2, \ldots, \theta_n)^T \qquad (2)$$

where $(\bullet)^T$ denotes vector or matrix transposition. The target bearings are measured from a direction finding (DF) sensor 104. In examples, the sensor 108 is moving, such that n bearing measurements can be obtained from different sensor positions over time. The coordinates for the sensor 108 associated with measurement $\theta i$, are represented by $(x_{si}, y_{si})$. The sensor 108 collects line of bearing measurements over a batch collection interval to produce an LOB dataset.

As described in Performance Analysis of Bearing-Only Target Location Algorithms by Gavish and Weiss (IEEE Transactions on Aerospace and Electronic Systems, Vol. 28, No. 3, July 1992), the angle measurements taken by the sensor 108 include the true bearings $\Theta_0$ corrupted by additive noise $\delta\Theta$ (given by Equation 3 below), which is assumed to be zero-mean Gaussian noise with an N by N covariance matrix, S, given by Equation (4) below. Bearing measurements have independent error and therefore S is diagonal (having no cross terms).

$$\delta\Theta = (\delta\theta_1, \delta\theta_2, \ldots, \delta\theta_N)^T \qquad (3)$$

$$S = \mathrm{diag}(\sigma_1^2, \ldots, \sigma_N^2) \qquad (4)$$

Thus, the position estimation problem is described by the nonlinear equation:

$$\Theta = g(x) + \delta\Theta \qquad (5)$$

where:

$$g(x) = [g_1(x), \ldots, g_N(x)]^T \qquad (6)$$

$$g_n(x) = \tan^{-1}\frac{\Delta_{yi}}{\Delta_{xi}} \qquad (7)$$

$$\Delta_{xi} = x_t - x_{si} \qquad (8)$$

$$\Delta_{yi} = y_t - y_{si} \quad i = 1, 2, \ldots, N$$

Equation (5) represents a geolocation description for the operation space corresponding to the LOB dataset collected by the sensor 108.

Applying an ML estimator to Equation (5), the ML estimation of the target position x is given by:

$$\hat{x}_{ML} = \underset{x}{\operatorname{argmin}} F_{ML}(x, \Theta) \qquad (9)$$

In Equation (5), the cost function FML (x, Θ) is given by:

$$F_{ML}(x, \Theta) = \frac{1}{2}[g(x) - \Theta]^T S^{-1}[g(x) - \Theta] \qquad (10)$$

Applying substitutions using Equation (6)-(8) above, the cost function can be rewritten as:

$$F_{ML}(x, \Theta) = \sum_{i=1}^{N} \frac{\left(\theta_i - \tan^{-1}\frac{x_{si} - x_0}{y_{si} - y_0}\right)^2}{\sigma_i^2} \qquad (11)$$

The cost function of Equations (6) and (11) assumes a stationary target 202. However, in some instances, the target 202 is moving. If the movement of the target 202 is uncompensated, this causes a displacement bias (error) in the geolocation estimates. Accordingly, to address this issue, the ML estimator can be augmented to account for a moving target 202 by adding a velocity component. For example, for targets with a linear velocity that is (roughly) constant over the collection interval, a linear velocity component ($v_x t_i$, $v_y t_i$) can be added to the non-linear cost function of Equation (11), as shown below in Equation (12):

$$F_{ML}(x, \Theta) = \sum_{i=1}^{N} \frac{\left(\theta_i - \tan^{-1}\frac{x_{si} - (x_0 + v_x t_i)}{y_{si} - (y_0 + v_y t_i)}\right)^2}{\sigma_i^2} \qquad (12)$$

Equations (11) and (12) involve a nonlinear least-squares minimization, and also represent only single-target scenarios. As discussed above, in the case of a single target/emitter, Equation (11) can be solved using the Stansfield approach. However, when multiple emitters are present and associations between the lines of bearing measurements and individual emitters are initially unknown, these cost functions do not provide a solution.

Accordingly, aspects and examples disclosed herein provide techniques for extending geolocation cost functions to multiple emitter scenarios and obtaining solutions in these scenarios. According to some examples, Equations (11) and (12) can be extended to form a multi-target geolocation cost function as follows:

$$F_{MtgtML}(x, \theta, P) = \sum_{i=1}^{N} P^T \frac{(\theta_i - G(\overline{X}))^2}{\sigma_i^2} \qquad (13)$$

In Equation (13), P is an $N_{tgt} \times 1$ vector (where $N_{tgt}$ represents the number of targets/emitters) of LOB association probabilities (the probabilities that each LOB measurement is associated with a particular one of the multiple emitters), $\sigma_i$ is an accuracy estimator associated with the LOB measurements (e.g., AOA rms error), and G ($\overline{X}$) is an $N_{tgt} \times 1$ vector of the LOB angle to the target location. G($\overline{X}$) is given by Equation (14a) below, without velocity augmentation, and by Equation (14b) including a linear velocity component as discussed above with reference to Equation (12).

$$G(\overline{X}) = \begin{bmatrix} \tan^{-1}\frac{x_{si} - x_0}{y_{si} - y_0} \\ \tan^{-1}\frac{x_{si} - x_1}{y_{si} - y_1} \\ \vdots \end{bmatrix} \qquad (14a)$$

$$G(\overline{X}) = \begin{bmatrix} \tan^{-1}\frac{x_{si} - (x_0 + v_x t_i)}{y_{si} - (y_0 + v_y t_i)} \\ \tan^{-1}\frac{x_{si} - (x_1 + v_x t_i)}{y_{si} - (y_1 + v_y t_i)} \\ \vdots \end{bmatrix} \qquad (14b)$$

Equation (13) does not have a closed form solution, and the nonconvex nature of the cost function does not lend itself to techniques such as gradient learning. In some examples, a grid search can be applied to attempt to find an optimal geolocation search; however, an exhaustive grid search of the space of LOB association probabilities and target locations is prohibitive in terms of computational cost. In addition, the form of Equation (13) assumes that the number of targets is known. In most cases, however, the number of targets is also a parameter to be estimated, and therefore, the cost function would be augmented with a penalty term that is a function of the number of targets and need to be optimized over the number of targets as well as the LOB association probabilities and target locations.

Due to the complexity of the multi-target scenario and its associated geolocation cost functions, existing ML estimation approaches are either impractical (e.g., computationally cost-prohibitive) and/or fail to produce a reasonably accurate geolocation solution, particularly in the case of closely spaced emitters.

Joint Maximum Likelihood Location Estimation Processes

Figure 3:
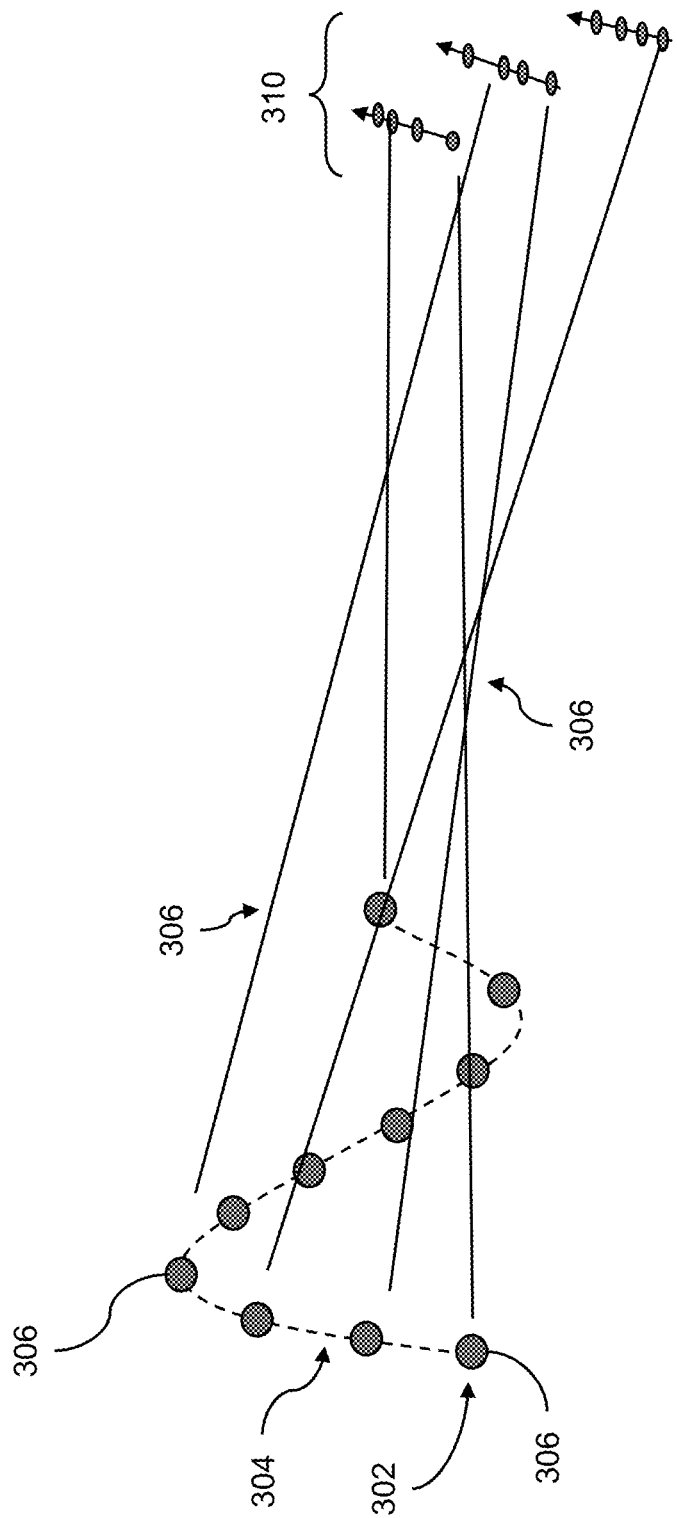
FIG. 3 is a diagram illustrating a geometry for estimating a position of multiple moving targets in accordance with aspects of the present disclosure.

To address problems associated with existing ML estimation processes applied to line of bearing based geolocation techniques, aspects and embodiments provide a joint ML optimization technique that solves a multi-target geolocation cost function, such as that set forth in Equation (13), for all emitters simultaneously. FIG. 3 illustrates an example geometry in which techniques for estimating positions of multiple moving targets according to aspects of the technology disclosed herein can be applied. In this example, there are multiple closely-spaced moving emitters (targets) 310, each with random RF emissions (e.g., radio transmissions, radar signals, etc.) over time. A collector (or sensor) 302 moves in space over time along a trajectory 304. The sensor 302 collects line-of-bearing (LOB) measurements 306 at different collection points 308 along the trajectory 304. As discussed above, initially, associations between the measured lines-of-bearing 306 and individual emitters 310 are unknown, and therefore, an association vector is used to describe the probabilities that each LOB measurement 306 is associated with a particular one of the multiple emitters 310.

In examples, the matrix of LOB association probabilities (an $N_{tgt} \times N_{LOB}$ concatenation of the PT vector noted above) is not treated as independent from target location; however, LOB associations are established as a function of LOB proximity to the hypothesized target location, as discussed further below. According to certain examples, a joint ML multiple emitter location estimation methodology uses a batch LOB based geolocation process designed to separate "closely spaced" targets (relative to range and AOA rms error) that are not separable via waveform signatures and/or do not have embedded identification information. For example, a closely spaced target scenario can be described as follows:

$$\Delta x < (k * \sigma AOA * \text{Range}); k \leq 6 \qquad (15)$$

In Equation (15), $\Delta x$ is the separation between targets in space, $\sigma AOA$ is the AOA rms error, and k is an integer number.

As discussed further below, examples of the process estimate the target model (e.g., number of targets and geolocations) by jointly estimating the best fit LOB associations for all targets. This differs from existing geolocation estimation methods that operate similar to a "greedy solver" in which locally optimal choices for individual target estimations may be made at each iteration, but a global optimal solution (for all targets) is unlikely to be found. Embodiments of the joint ML optimization process disclosed herein allow target acquisition systems to operate even when the targets are very closely spaced, for example, with target separations in a range of about 2.40-40.

Figure 4:
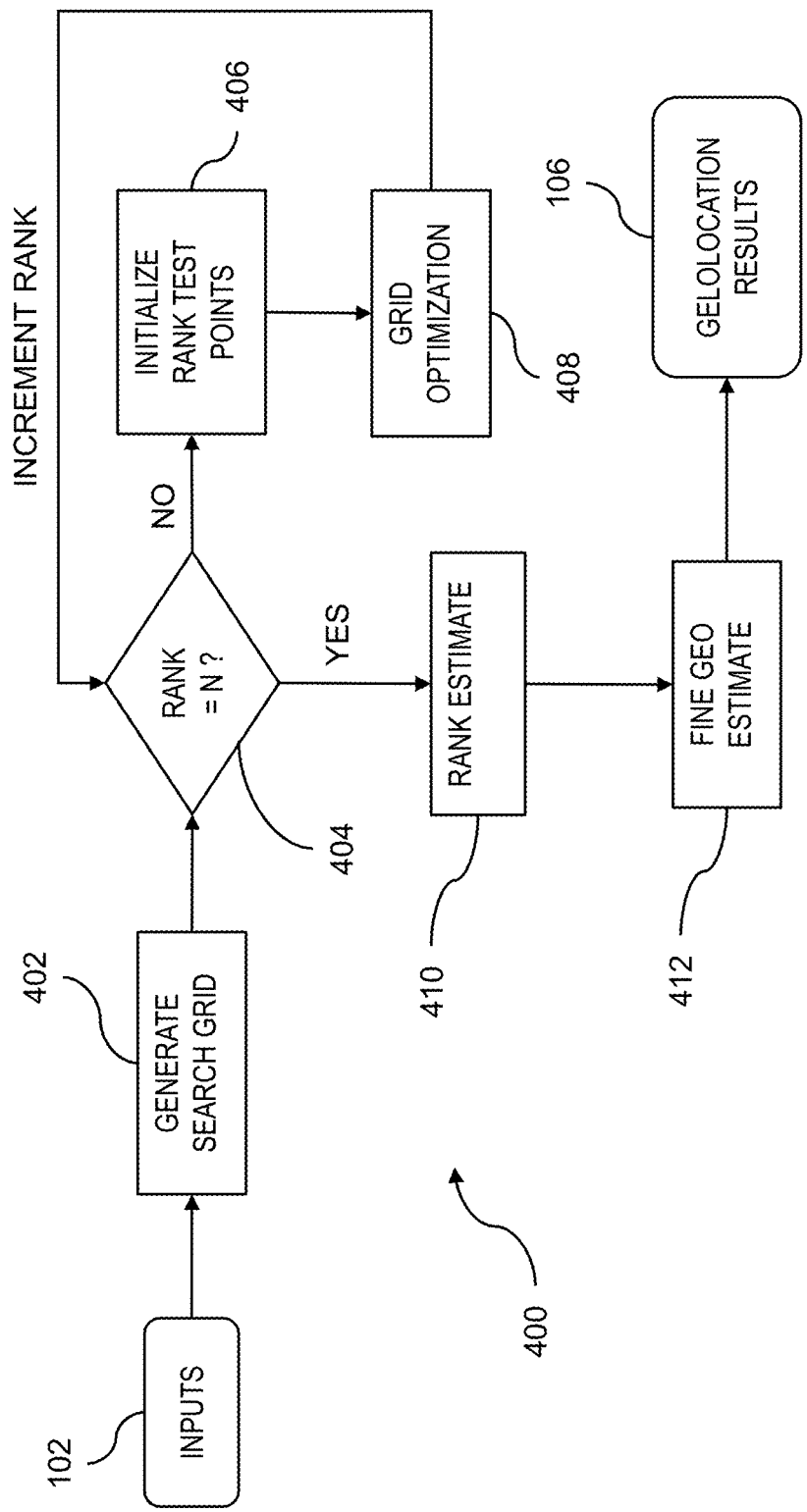
FIG. 4 is a flow diagram illustrating one example of a methodology for multiple target position estimation in accordance with aspects of the present disclosure.

Referring to FIG. 4, there is illustrated a flow diagram of one example of a joint ML estimation methodology according to certain aspects. The method begins with inputs 102, which correspond to one or more LOB datasets including line of bearing measurements collected by the sensor 302 over the batch collection interval.

At 402, a search grid covering the operation space of the joint ML estimation process is generated. For example, the system 100 processes the input LOB dataset to determine the local geographic and timing frames of reference. The process may include performing a system assessment to determine the types of geolocation solution expected, such as whether the target(s) 202 are expected to be stationary or moving, whether any AOA error information is available, and for expected moving targets, whether target velocities are known or need to be estimated. Based on this information, the search grid can be set up. In some examples, if the targets 202 are expected to be moving, the process solves for a first order velocity component over the batch collection interval corresponding to the input LOB dataset, such that a velocity-augmented cost function (e.g., as described by Equations (13) and (14b) above) can be used.

Once the search grid has been established, the joint ML process solves the cost function over the search grid to produce the output geolocation estimates 106. A current hypothesized number of emitters/targets is referred to as the rank of the search. As shown in FIG. 4, in some examples, the process begins with an assumption of one target (rank=1), and the input parameters specify a maximum number of expected targets (rank=N). At 406, the system initializes the test points for the current rank. As discussed above, in order to perform a grid-based search, a course estimate of initial geolocation points (grid seeds) are used as a starting point for the subsequent optimization. In some examples, the grid seeds can be provided to the joint ML estimation processor 104 from other system information/components or from an external component to the system 100. In other examples, the process can be "self-seeding" and use one of various different methods to obtain the grid seeds. Examples of self-seeding methods that can be used are discussed in more detail below.

At 408, the system, the grid search or optimization is performed for the current rank. In some examples, the grid optimization at 408 includes solving the multi-target cost function of Equation (13) to produce an output set of estimated geolocations for the target(s) 202. However, as discussed above, unlike a standard ML estimator, which optimizes the LOB dataset for one target at a time, for ranks of 2 and higher, the joint ML process of embodiments disclosed herein optimizes the LOB dataset for all targets simultaneously. The rank is then incremented, and if the new rank is lower than the maximum (evaluated at decision block 404), the process repeats 406 and 408.

The computation cost of a full maximum likelihood search of a space of size M (i.e., grid size=M) for N emitters has a cost of $O(M^N)$. It will be appreciated that M can represent a two-dimensional or three-dimensional grid size. This computation cost can be prohibitive in many applications, particularly for cases where N=3 or higher, or even for lower rank if a velocity-augmented cost function (such as that of Equations (13) and (14b), for example) is used. Accordingly, in some examples, an expectation maximization approach is used to perform the grid search, thereby reducing the computation cost to $O(M*N)$. Using this approach provides a reasonable computational cost, with almost the same performance as performing the full ML grid search. The reduction in computational cost allows for the velocity-augmented cost function to be used in 408. In addition, other optimization parameters, such as AOA accuracy refinement or bias function estimation, can be incorporated.

Expectation maximization is a technique that reduces the cost function analysis problem in 408 to a series of one-dimensional optimizations. The following pseudo-code provides an example of an expectation maximum approach that can be used in the methodology of FIG. 4. The below example corresponds to a velocity-augmented cost function.

```
results = [ ];
FOR   modelOrder = 1:MaxOrder
    seed points(2:modelOrder) = results(modelOrder-1)   // a seed is not needed for the first
                                                        // optimized value
    WHILE NOT done
        FOR tgtIdX=1:modelOrder   //EM: optimize one parameter at a time
            optimize ML solution over grid for tgtIdx leaving other parameters fixed
            optimize velocity for tgtIdx
        END FOR
        IF |location delta| < threshold
            done = TRUE
            results[modelOrder] = best score location/velocity
        END
    END WHILE
END FOR
```

According to this example, the expectation maximization approach optimizes the ML solution over the grid space for each target, one parameter at a time. Note that the ML solution is achieved for all targets simultaneously (unlike existing estimators that attempt to provide a multi-target geolocation estimate); however, different parameters, such as location, velocity, etc., are optimized one at a time using the expectation maximization approach. This approach can be implemented at 408 for each rank (referred to as modelOrder in the pseudocode above) and repeated until the maximum rank (maximum model order) is reached.

Still referring to FIG. 4, at 410, the geolocation solutions obtained for each rank iteration (each hypothesized number of estimated targets) are evaluated to provide an estimate of the actual rank, that is, the actual number of targets 202 corresponding to the LOB dataset. To simplify the optimization procedure and obtain a form of the cost function that allows the performance of the optimization over rank to be more readily evaluated, the ML form of Equations (12) and (13) can be modified to provide an ML scoring function given by Equation (16) below. For LOB measurements with N*o (o being an accuracy estimator, such as the rms error, associated with the LOB measurements) of the hypothesized location, the ML scoring function of Equation (16) will provide a positive value of MLscore, limited to zero for values with an LOB error greater than N*o evaluated relative to the hypothesized location.

$$ML_{score} = \sum_{i=1}^{N} \max\left(N_{cutoff}^2 - \frac{\Delta_{AOAi}^2}{\sigma_i^2}, 0\right) \quad (16)$$

In Equation (16), AAOAi is the difference between the computed angle of arrival (AOA) and the AOA to the current best fit test point. For a Gaussian AOA error distribution, the expected value of MLscore is given by:

$$E(ML_{score}) = N * \left(N_{cutoff}^2 - \frac{\sigma_i^2}{\sigma_i^2}\right) = N * \left(N_{cutoff}^2 - 1\right) \quad (17)$$

This form of the cost function also provides insight into how the association probability matrix is assigned according to certain examples. Assuming an emitter/collector geometry where the LOBs for each emitter are not within $N_{cutoff}*\sigma$ of any other emitter, this form of the cost function directly provides the terms of the LOB assignment matrix in that nonzero score values for an emitter equate to an assignment entry of 1, while other entries receive a 0 in the LOB assignment to a given emitter. In some examples, $N_{cutoff}=3$, although in other examples, $N_{cutoff}$ may have a different integer value. In some examples, the distribution of emitter LOB's is such that a significant portion of the LOBs can potentially be related to more than one emitter (i.e., overlapped distributions). The LOB assignment probabilities for such examples are described below.

Figure 5A:
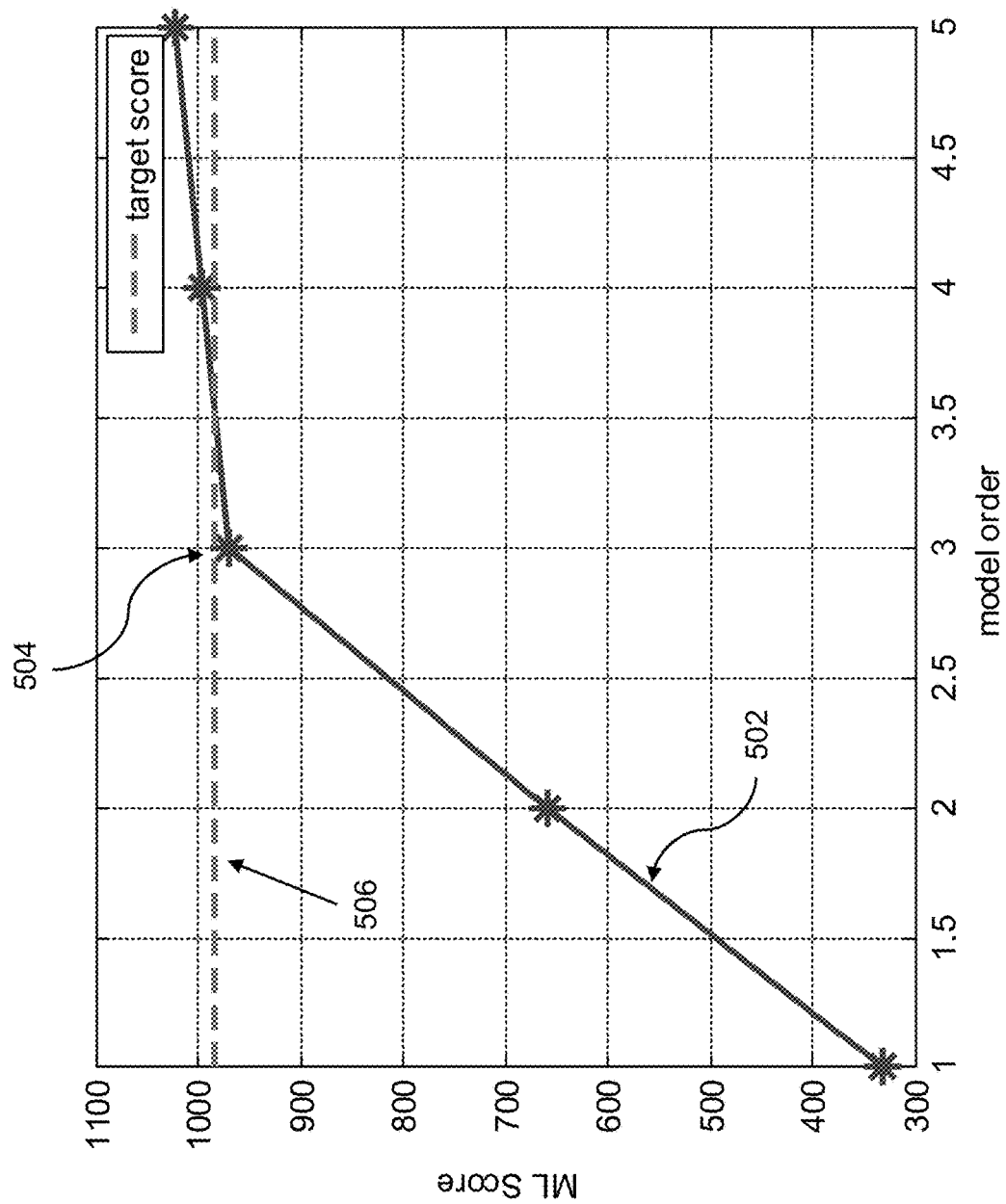
FIG. 5A is a graph illustrating simulated results for estimating model order of an example operation space according to aspects of the present disclosure.
Figure 5B:
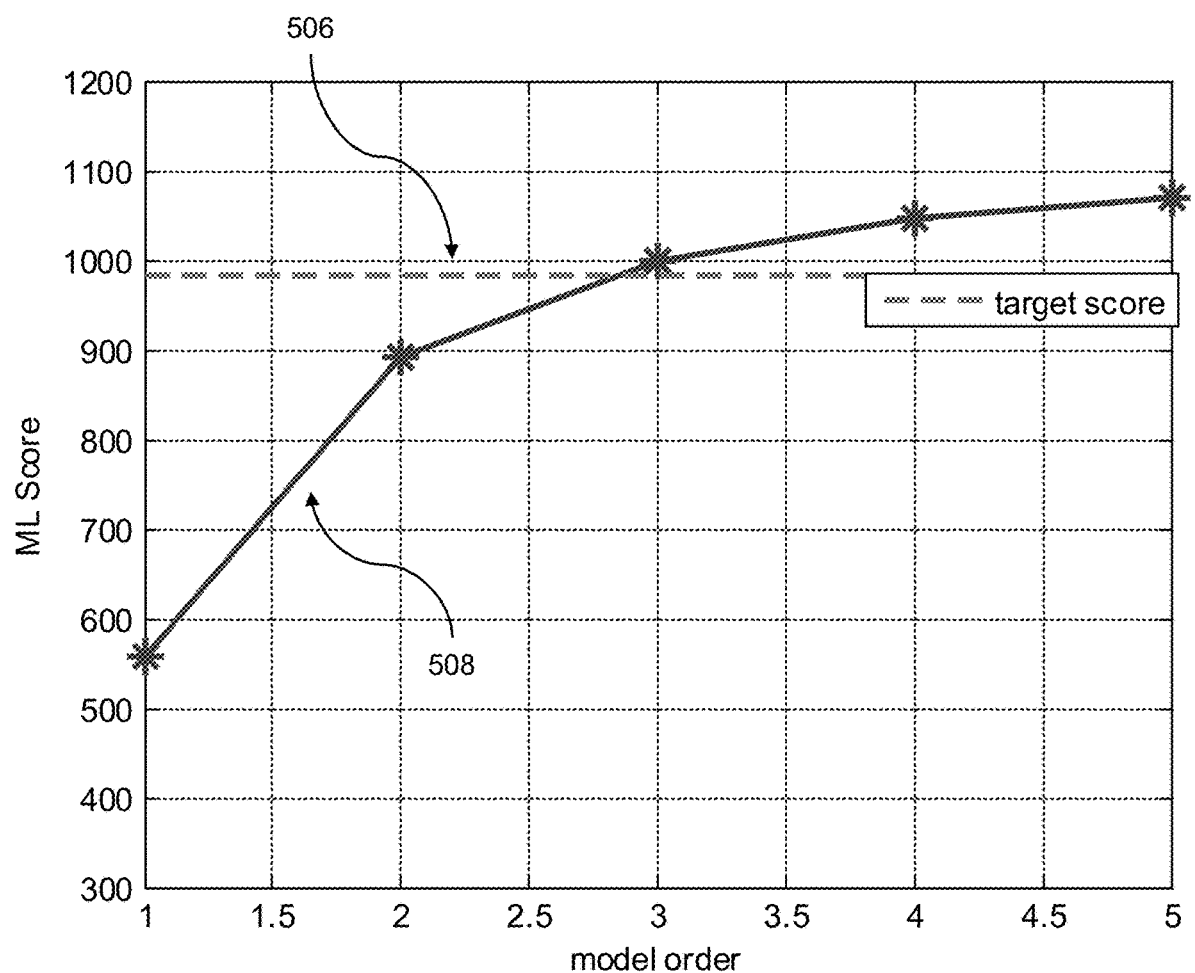
FIG. 5B is a graph illustrating simulated results for estimating model order of another example operation space according to aspects of the present disclosure.

This concept is illustrated graphically in FIGS. 5A and 5B. Referring to FIG. 5A, there is illustrated a graph of the MLscore value as a function of the model order (rank) of a LOB dataset, represented by curve 502. In this example, there are three targets, with a target separation of 6σ. The "knee" 504 in the curve 502 indicates the correct model order, which in this case is three. Dotted line 506 corresponds to the target score associated with the correct model number. In the example shown in FIG. 5A, the "knee" 504 is well defined and thus clearly indicates the correct model order; however, in other examples, it may be more difficult to determine the correct model order. In particular, this may be the case where the target separation is small. For example, FIG. 5B illustrates an example for three targets with a target separation of 2.7σ. Curve 508 represents the MLscore value as a function of the model order. As can be seen comparing FIGS. 5A and 5B, it is far more difficult in FIG. 5B to identify a defined "knee" that would indicate the correct model order.

Figure 6:
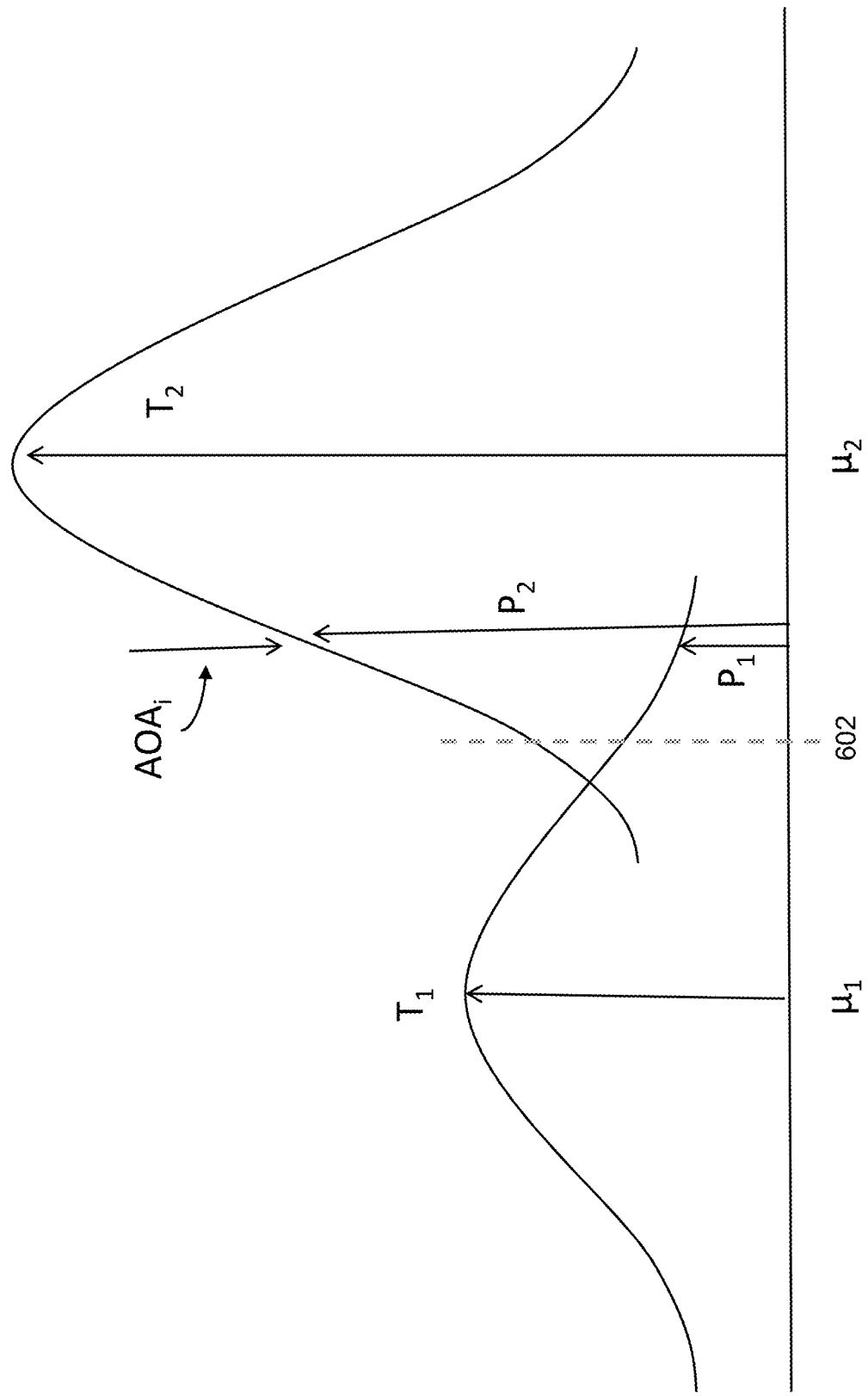
FIG. 6 is graph illustrating an example of probability density functions associated with a pair of targets, in accordance with aspects of the present disclosure.

As discussed above, the cost function of Equation (13) includes a term representing the LOB association probabilities. Accordingly, in examples, during the optimization process at 408, each line of bearing measurement is associated with a particular estimated target. The LOB data is fitted to estimated targets to produce estimated locations of the targets based on intersecting the lines of bearing, as discussed above. To achieve this association, probability density functions can be evaluated that describe the probabilities of a particular line of bearing ($AOA_i$) being associated with each estimated target. An example is illustrated in FIG. 6. In this example, there are illustrated two probability density functions showing the probability distribution that a particular measurement, $AOA_i$, is associated with each of two targets, $T_1$ and $T_2$. As shown, with these distributions, the measurement $AOA_i$ has a probability $P_1$ of being associated with target $T_1$ and a probability $P_2$ of being associated with target $T_2$. In some examples, a given $AOA_i$ is associated with a target based on hard associations. In FIG. 6, line 602 represents a hard boundary cutoff for associating a line of bearing measurement with either target $T_1$ or target $T_2$. In this example, using the hard boundary cutoff 602, measurement $AOA_i$ would be associated with target $T_2$. The use of hard associations can create AOA distributions (associations with targets) that lead to bias errors in the geolocation solution. These biased distributions can lead to problems in identifying the correct model order.

Accordingly, in some examples, a soft weighting scheme, also called soft LOB association, can be used instead of hard boundary-based associations. Using a soft association approach, rather than being assigned to target $T_2$. $AOA_i$ is given an association weighting function that probabilistically associates it with both distributions. Using a soft association approach can significantly reduce both bias errors and the associated problems with identifying the correct model order. An example of the weighting function is given by:

$$wgt_i = \frac{T_i P_i}{\sum_{k=1}^{N} T_i P_i} \quad (18)$$

In Equation (18), k represents the number of iterations used to converge on a geolocation solution in 408, and $T_i$ and $P_i$ are given by Equations (19) and (20), respectively:

$$T_i = \text{count}(|x - \mu_i| < \sigma) \quad (19)$$

$$P_i = e^{\frac{-(x-\mu_i)^2}{2\sigma^2}} \quad (20)$$

Figure 7A:
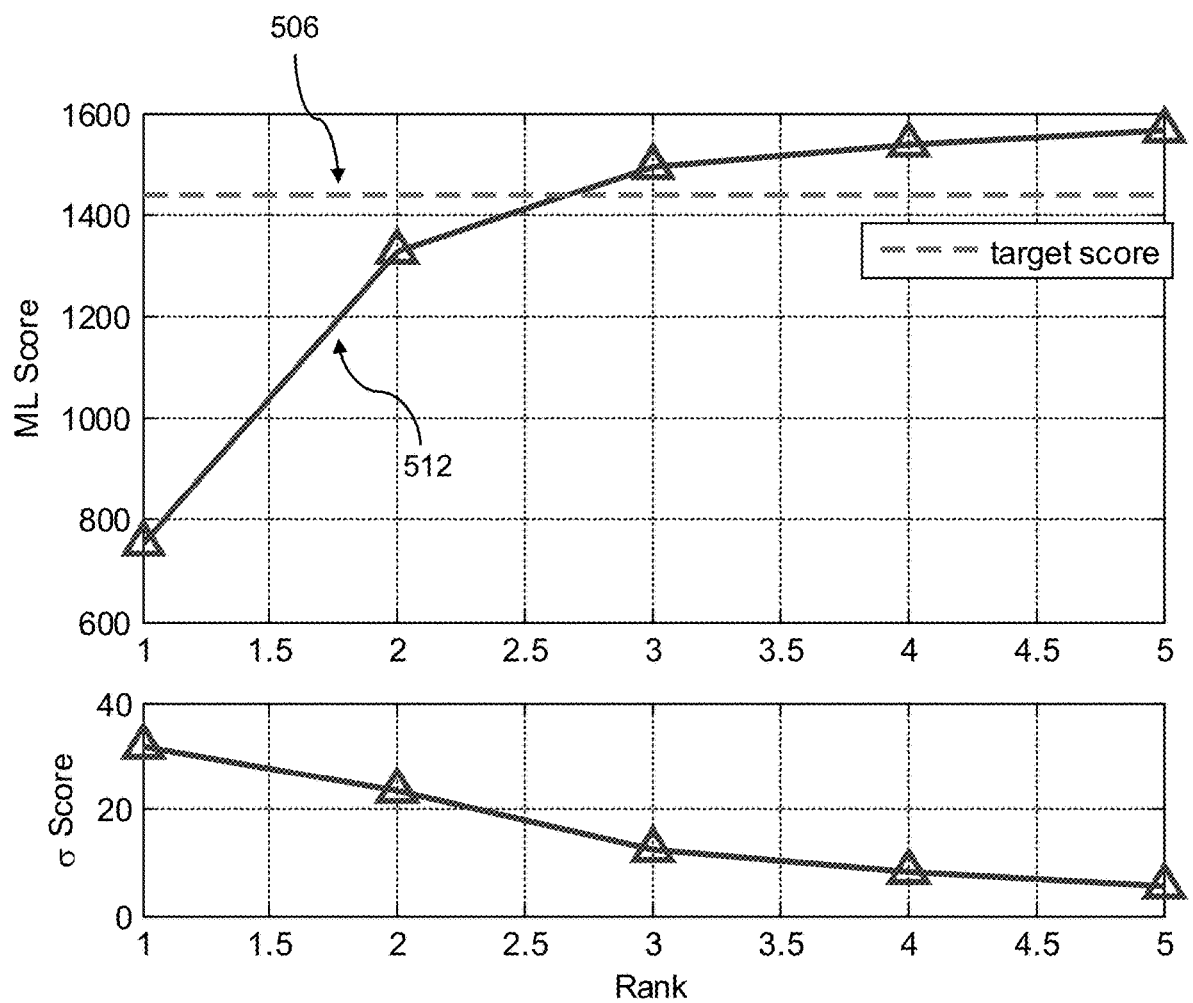
FIG. 7A is a graph illustrating one example of simulated results for estimating model order of an operation space according to aspects of the present disclosure.
Figure 7B:
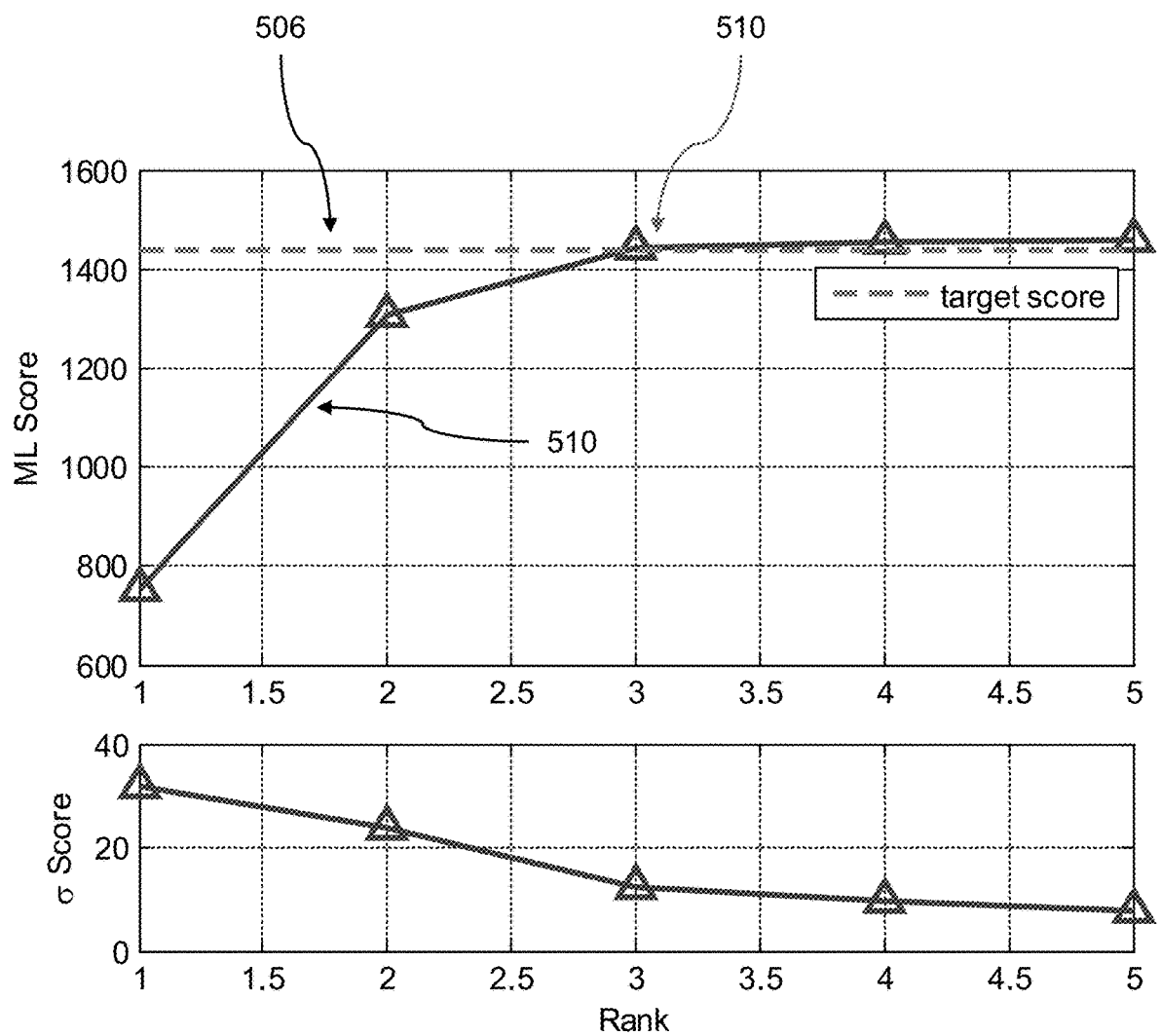
FIG. 7B is a graph illustrating another example of simulated results for estimating model order of the operation space of FIG. 7A, according to aspects of the present disclosure.

FIGS. 7A and 7B are graphs illustrating differences between using a hard association approach and a soft association approach for assigning lines of bearing to a particular location estimate corresponding to a particular target. In the illustrated example, the LOB dataset corresponded to three moving targets with Gaussian noise (c) on the LOB measurements. FIG. 7A shows simulation results using hard associations, and FIG. 7B shows simulation results using soft associations. As can be seen with reference to FIGS. 7A and 7B, curve 510 in FIG. 7B flattens out significantly more after rank (model order 3) than does curve 512 in FIG. 7A, thus making it easier in the case of FIG. 7B to identify model order 3 as the correct model order for the dataset.

Referring again to FIG. 4, once the rank estimate is obtained at 410, the process includes, at 412, refining the geolocation solutions obtain at 408 based on the selected rank (the assumed correct model order). For example, 412 may include discarding the geolocation solutions associated with incorrect model orders and retaining only the geolocation solutions obtained for the assumed correct model order. The resulting geolocation results are then provided as outputs 106.

The optimized solution using the expectation maximization approach discussed above is not guaranteed to be the maximum likelihood solution; rather, in some instances, it may be a local maximum. As shown in FIG. 4, and as discussed above, the optimization process at 406 and 408 is recursive, repeating for each estimated rank until the maximum rank, N, is reached. Using the expectation maximization approach discussed above, the previous solution obtained at 408 is used to initialize the parameter estimates for the subsequent rank. This approach can create local maxima issues where the process gets "stuck" and cannot converge to the true solution (since expectation maximization optimizes one parameter at a time). Simulated test data has shown that the approach does produce the maximum likelihood result for many geolocation scenarios of interest. However, simulation data has also shown that there can be some difficult collection scenarios, such as highly symmetric LOB collections, for example, that have higher probability of the false maxima condition. For example, simulations have shown convergence error rates of up to 10% when tested with these more difficult collection scenarios. Accordingly, two approaches can be implemented to address this issue and reduce the geolocation failure rate to less than about 1%. One approach involves using a multi-survivor optimization process, and the other uses time diversity, both of which are discussed further below.

According to certain embodiments, a multi-survivor approach is implemented in which multiple candidate solutions are propagated from one rank into the next rank. Accordingly, the next rank grid search has a higher likelihood of finding the global maximum. The following is an example of pseudo-code that can be used to implement such a multi-survivor approach:

Input: candidatePeaks (Nsurvivor seed from previous
     processing or empty for rank 1)

```
done = FALSE
WHILE NOT done
   FOR tgtIdX=1:modelOrder
      newPeaks = [ ];
      FOR candidateIdx = 1:Ncandidate
         generate ML grid for entry tgtIdx for candidatePeaks(candidateIdx)
            location grid values
         select Nsurvivor peaks from ML grid
         add peaks to newPeaks List
      END
   END FOR
   optimize newPeaks over velocity
   downselect newPeaks to Nsurvivor peaks (unique w/ best score)
   update candidatePeaks with downselected peaks
   IF |location delta|<threshold
      done = TRUE
   END
END WHILE
```

Simulation results using an LOB dataset having two emitters and a 40 target separation have shown that using the multi-survivor approach described above resulted in no rank estimation errors or failed geolocation solutions. In contrast, simulations running the above-discussed joint ML process with expectation maximization and a single-survivor approach on the same LOB dataset produced approximately a 10% error rate in both rank estimation and failed geolocation results. Similarly, simulations using an LOB dataset having three emitters and a 40 target separation showed that the multi-survivor process produced no rank estimation errors or failed geolocation solutions.

As discussed above, the computation cost associated with the joint ML estimation process using expectation maximization is O(M*N), where N is the rank and M is the grid size. The computation cost for a multi-survivor approach, using two survivors per iteration, is given by:

$$O\left(\sum_{i=1}^{N} 2^{i-1} M\right) \qquad (21)$$

Although this approach may become cost prohibitive for high rank numbers, simulations using a C++ implementation of the process showed only a 2× increase in processing time for N=5 compared to the single-survivor approach. Using optimizations such as early survivor trimming can reduce the computation cost and improve processing time, especially for higher rank numbers.

As an alternative to the additional computational cost of a multi-survivor method, time diversity could be implemented to reduce the effects of false maxima conditions that may occur through the use of the recursive expectation maximization process discussed above. The time diversity approach involves repeating the geolocation analysis on a second LOB dataset collected over a batch collection interval that is at least partially separated in time relative to the previous batch collection interval. As noted above, the sensor 302 (e.g., receiver 108 in FIG. 1) collects LOB measurements 306 over time. In some examples, to implement time diversity, the measurements collected by the sensor 302 can be allocated into LOB datasets that have some degree of overlap (e.g., 80%, 75%, 50%, etc.), meaning that at least some of the same measurements are included in both LOB datasets, but at least some of the measurements in the second LOB dataset are new. The geolocation computations of methodology 400 can be performed successively on the two (or more) LOB datasets. The introduction of the new measurements in the second LOB dataset can remove false local maxima and facilitate convergence on the true global maximum. In one example, if the two successive geolocation results 106 are in agreement (e.g., return the same number of targets and locations of those targets with a threshold error range), then the geolocation result can be considered a success. If not, then the output 106 can be revised to indicate a geolocation failure, and the process 400 can be repeated again on two or more input LOB datasets 102, until a valid geolocation result is obtained.

In some examples, the search region for the ML optimization can have as an input a known area of interest when the emitters 310 are known to be located. In other examples, the search area can be ascertained using a procedure known as self-seeding. In some implementations, self-seeding establishes an optimization search procedure known as a line of bearing (LOB) walk. The LOB walk is used to find regions of LOB convergence to focus on for the estimator to provide an initial set of geolocation solutions to be used as seed points. In the LOB walk process, the cost function of Equation (16) is evaluated assuming a single target (that is, the rank=1 condition).

Grid points are obtained using an LOB walking function where the rank=1 (single target) values of the cost function that exceed a parameterized threshold are accumulated and quantized to a parameterized resolution appropriate for the particular problem (a combination of target range and azimuth accuracy). The values from this walk function are retained as the search grid for optimizations the remaining rank values. The maximum of the walk process is retained as the rank=1 solution. This seeding approach is compatible with the multi-survivor optimization techniques discussed above. In some examples, an LOB walk based seeding procedure can be used at 402/406 to seed the initial search grid for rank=1.

Thus, aspects and embodiments provide a geolocation (target acquisition) methodology that is configured to solve the geolocation estimation problem for multiple targets simultaneously, and as a result, can achieve accurate (within reasonable tolerances) geolocation estimates even for relatively closed spaced emitters. Examples of the processes disclosed herein can be used to augment a tracking system, for example, to assist in making track splitting decisions at large ranges. Examples may also be used to perform general batch geolocation services for closely spaced emitters that do not have embedded ID information. It will be appreciated that various other applications and systems may benefit from the use and integration of examples of the processes disclosed herein.

Example Computing Platform

Figure 8:
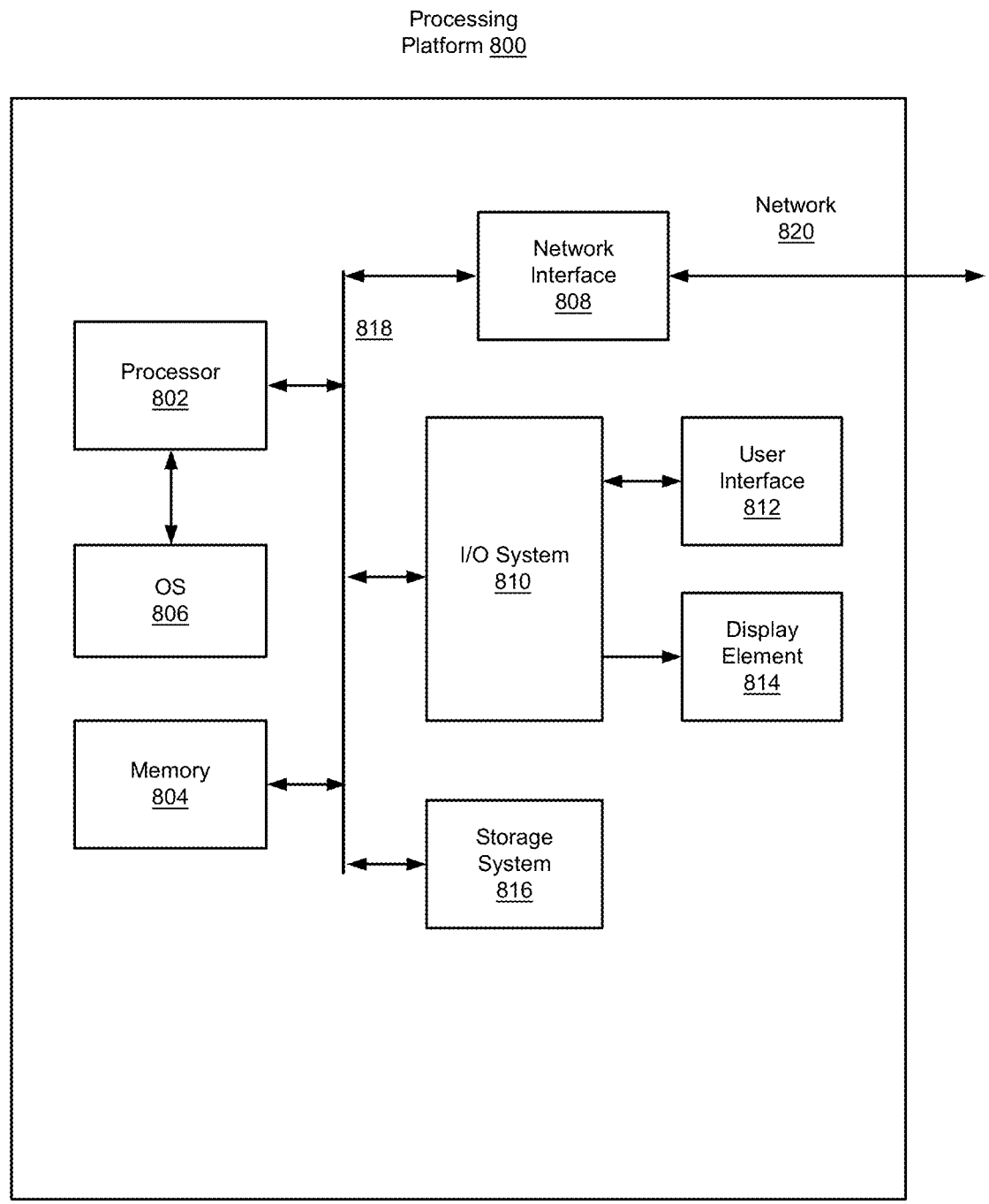
FIG. 8 is a block diagram of a processing platform configured to be used in the system of FIG. 1 and implement examples of the methodology of FIG. 4, in accordance with aspects of the present disclosure.

FIG. 8 is a block diagram of a processing platform configured to implement joint ML target location estimation methodologies in accordance with aspects of the present disclosure. The computing platform 800 may be part of the system 100 and may be used to implement various components of the system 100, including the joint ML estimation processor 104 discussed above. In some examples, the computing platform 800, or portions thereof, may be hosted on, or otherwise be incorporated into the electronic systems of an aircraft, a projectile, a space-based platform, a ground based platform, or a handheld platform in which signals are received and/or transmitted based on a given standard. Any combination of different devices may be used in certain embodiments.

In some embodiments, the computing platform 800 may comprise any combination of a processor 802, a memory 804, a network interface 808, an input/output (I/O) system 810, a user interface 812, a display element 814, and a storage system 816. As can be further seen, a bus and/or interconnect 818 is also provided to allow for communication between the various components listed above and/or other components not shown. The computing platform 800 can be coupled to a network 820 through the network interface 808 to allow for communications with other computing devices, platforms, or other resources, including, for example, the signal receiver 104. Other componentry and functionality not reflected in the block diagram of FIG. 8 will be apparent in light of this disclosure, and it will be appreciated that other embodiments are not limited to any particular hardware configuration.

The processor 802 can be any suitable processor, and may include one or more coprocessors or controllers, such as an audio processor, a graphics processing unit, or hardware accelerator, to assist in the execution of mission software and/or any control and processing operations associated with platform 800. In examples, the processor 802 implements the joint ML estimation processor 104 discussed above. In some embodiments, the processor 802 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array (FPGA) or other device configured to execute code. The processors may be multithreaded cores in that they may include more than one hardware thread context (or "logical processor") per core. The processor 802 may be implemented as a complex instruction set computer (CISC) or a reduced instruction set computer (RISC) processor. In some embodiments, the processor 802 may be configured as an x86 instruction set compatible processor. The processor 802 can be configured to perform any of the various functions and processes described herein and with reference to FIGS. 1-7.

The memory 804 can be implemented using any suitable type of digital storage including, for example, flash memory and/or random access memory (RAM). In some embodiments, the memory 804 may include various layers of memory hierarchy and/or memory caches. The memory 804 may be implemented as a volatile memory device such as, but not limited to, a RAM, dynamic RAM (DRAM), or static RAM (SRAM) device. The storage system 816 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

The processor 802 may be configured to execute an Operating System (OS) 806 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with the computing platform 800, and therefore may also be implemented using any suitable existing or subsequently-developed platform.

The network interface 808 can be any appropriate network chip or chipset which allows for wired and/or wireless connection between other components of platform 800 and/or network 820, thereby enabling the computing platform 800 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

The I/O system 810 may be configured to interface between various I/O devices and other components of the computing platform 800. I/O devices may include, but may not be limited to, the user interface 812 and display element

814. The user interface 812 may include devices (not shown) such as a touchpad, keyboard, and mouse, etc., for example, to allow the user to control the system. In some examples, the user interface 812 may include a graphical user interface. The display element 814 may be configured to display information to a user. The I/O system 810 may include a graphics subsystem configured to perform processing of images for rendering on the display element 814. The graphics subsystem may be a graphics processing unit or a visual processing unit (VPU), for example. An analog or digital interface may be used to communicatively couple the graphics subsystem and the display element 814. For example, the interface may be any of a high definition multimedia interface (HDMI), DisplayPort, wireless HDMI, and/or any other suitable interface using wireless high definition compliant techniques. In some embodiments, the graphics subsystem could be integrated into the processor 802 or any chipset of the computing platform 800. The I/O system 810, the user interface 812, and the display element 814 can be configured to implement various functionality associated with the display device 110 and presentation of the outputs 106 to a user of the system 100.

It will be appreciated that in some embodiments, the various components of the computing platform 800 may be combined or integrated in a system-on-a-chip (SoC) architecture. In some embodiments, the components may be hardware components, firmware components, software components or any suitable combination of hardware, firmware or software.

Various embodiments may be implemented using hardware elements, software elements, or any combination thereof. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth.

Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic.NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In certain embodiments, the system may leverage processing resources provided by a remote computer system accessible via the network 820. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments, the computing platform 800 may comprise additional, fewer, or alternative subcomponents as compared to those included in the example embodiment of FIG. 8.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable medium for storing digital information, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

In alternative embodiments, the components and/or modules disclosed herein can be implemented with hardware, including gate-level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

Further Example Embodiments

The following examples pertain to further embodiments, from which numerous permutations and configurations will be apparent.

Example 1 provides a method of estimating geolocations of a plurality of targets, the method comprising receiving, via a signal receiver, a plurality of bearing measurements, individual bearing measurements representing a respective line of bearing between the signal receiver and a respective target of the plurality of targets, and establishing a search grid based at least in part on the plurality of bearing measurements. The method further comprises successively for each rank of a plurality of ranks, performing a joint maximum likelihood optimization procedure on the plurality of bearing measurements over the search grid to produce a corresponding geolocation solution set for the rank, such that, after performing the joint maximum likelihood optimization procedure for the plurality of ranks, a plurality of geolocation solutions sets is produced, wherein each rank corresponds to a current estimated number of targets in the plurality of targets, and wherein performing the joint maximum likelihood optimization procedure includes solving a nonlinear multi-target geolocation description function for the estimated number of targets corresponding to the rank. The method further comprises evaluating, based on a scoring function, the plurality of geolocation solution sets to estimate a true number of targets in the plurality of targets, based on the estimated true number of targets, selecting the corresponding geolocation solution set for the rank corresponding to the estimated true number of targets; and processing the selected corresponding geolocation solution set to produce a geolocation result that includes an estimated location of each target in the estimated true number of targets.

Example 2 includes the method of Example 1, wherein performing the joint maximum likelihood optimization procedure includes applying an expectation maximization process to solve the nonlinear multi-target geolocation description function.

Example 3 includes the method of Example 2, wherein applying an expectation maximization process includes applying a multi-survivor optimization process wherein at least two candidate solutions to the nonlinear multi-target geolocation description function are propagated from the rank into a next rank.

Example 4 includes the method of any one of Examples 1-3, wherein performing the joint maximum likelihood optimization procedure includes, prior to solving the nonlinear multi-target geolocation description function, determining a plurality of seed points by applying a line of bearing walk function to the plurality of bearing measurements, and seeding the search grid with the plurality of seed points.

Example 5 includes the method of any one of Examples 1-4, wherein performing the joint maximum likelihood optimization procedure includes computing association probabilities for each bearing measurement in the plurality of bearing measurements, each association probability representing probabilities of the bearing measurement being associated with respective individual target of the current estimated number of targets.

Example 6 includes the method of Example 5, wherein performing the joint maximum likelihood optimization procedure further includes estimating the location of each target of the current estimated number of targets using a weighted least squares process, wherein weights used in the weighted least squares process correspond to a combination of the association probabilities and accuracy estimators for each bearing measurement.

Example 7 includes the method of any one of Examples 1-6, wherein receiving the plurality of bearing measurements includes moving the signal receiver along a trajectory, and receiving, via the signal receiver, the plurality of bearing measurements at different collection points along the trajectory over time.

Example 8 includes a target acquisition system configured to implement the method of any one of Examples 1-7.

Example 9 includes a computer program product encoded with instructions that that when executed by one or more processors cause the method of any one of Examples 1-7 to be carried out.

Example 10 provides a target acquisition system comprising at least one signal receiver configured to collect a plurality of bearing measurements over a batch collection interval, individual bearing measurements of the plurality of bearing measurements representing a line of bearing between the at least one signal receiver and a respective target, at least one processor, and a data storage storing a plurality of instructions that when executed by the at least one processor configure the target acquisition system to perform a joint maximum likelihood target location estimation process. The process includes establishing a search grid based on the plurality of bearing measurements, and successively for each rank of a plurality of ranks, performing a joint maximum likelihood optimization procedure on the plurality of bearing measurements over the search grid to produce a corresponding geolocation solution set for the rank, such that, after performing the joint maximum likelihood optimization procedure for the plurality of ranks, a plurality of geolocation solutions sets is produced, wherein each rank corresponds to a current estimated number of targets in the plurality of targets, and wherein performing the joint maximum likelihood optimization procedure includes solving a nonlinear multi-target geolocation description function for the estimated number of targets associated with the rank. The process further includes evaluating, based on a scoring function, the plurality of geolocation solution sets to estimate a true number of targets in the plurality of targets, based on the estimated true number of targets, selecting the corresponding geolocation solution set for the rank corresponding to the estimated true number of targets, and processing the selected corresponding geolocation solution set to produce a geolocation result that includes an estimated location of each target in the estimated true number of targets.

Example 11 includes the target acquisition system of Example 10, further comprising a display device configured to display the geolocation result.

Example 12 includes the target acquisition system of one of Examples 10 and 11, wherein to perform the joint maximum likelihood optimization procedure, the data storage further includes instructions that when executed by the at least one processor configure the target acquisition system to apply an expectation maximization process to solve the nonlinear multi-target geolocation description function.

Example 13 includes the target acquisition of Example 12, wherein to apply the expectation maximization process, the data storage further includes instructions that when executed by the at least one processor configure the target acquisition system to apply a multi-survivor optimization process wherein at least two candidate solutions to the nonlinear multi-target geolocation description function are propagated from the rank into a next rank.

Example 14 includes the target acquisition system of any one of Examples 10-13, wherein to perform the joint maximum likelihood optimization procedure, the data storage further includes instructions that when executed by the at least one processor configure the target acquisition system to compute association probabilities for each bearing measurement in the plurality of bearing measurements, each association probability representing probabilities of the bearing measurement being associated with respective individual targets of the current estimated number of targets.

Example 15 includes the target acquisition of Example 14, wherein to perform the joint maximum likelihood optimization procedure, the data storage further includes instructions that when executed by the at least one processor configure the target acquisition system to estimate the location of each target of the current estimated number of targets using a weighted least squares process, wherein weights used in the weighted least squares process correspond to a combination of the association probabilities and accuracy estimators for each bearing measurement.

Example 16 includes the target acquisition of any one of Examples 10-15, wherein to perform the joint maximum likelihood optimization procedure, the data storage further includes instructions that when executed by the at least one processor configure the target acquisition system to, prior to solving the nonlinear multi-target geolocation description function, determine a plurality of seed points by applying a line of bearing walk function to the plurality of bearing measurements, and seed the search grid with the plurality of seed points.

Example 17 includes the target acquisition of any one of Examples 10-16 wherein the at least one signal receiver is configured to move along a trajectory over time and to collect the plurality of bearing measurements from different collection points along the trajectory.

Example 18 provides a computer program product including one or more machine-readable media encoded with instructions that when executed by one or more processors cause a process to be carried out for estimating geolocations of a plurality of targets. The process comprises receiving, via a signal receiver, a plurality of bearing measurements, individual bearing measurements representing a respective line of bearing between the signal receiver and a respective target of the plurality of targets, establishing a search grid based at least in part on the plurality of bearing measurements, and successively for each rank of a plurality of ranks, performing a joint maximum likelihood optimization procedure on the plurality of bearing measurements over the search grid to produce a corresponding geolocation solution set for the rank, such that, after performing the joint maximum likelihood optimization procedure for the plurality of ranks, a plurality of geolocation solutions sets is produced, wherein each rank corresponds to a current estimated number of targets in the plurality of targets, and wherein performing the joint maximum likelihood optimization procedure includes solving a nonlinear multi-target geolocation description function for the current estimated number of targets. The process further comprises evaluating, based on a scoring function, the plurality of geolocation solution sets to estimate a true number of targets in the plurality of targets, based on the estimated true number of targets, selecting the corresponding geolocation solution set for the rank corresponding to the estimated true number of targets, and processing the selected corresponding geolocation solution set to produce a geolocation result that includes an estimated location of each target in the estimated true number of targets.

Example 19 includes the computer program product of Example 18, wherein performing the joint maximum likelihood optimization procedure includes applying an expectation maximization process to solve the nonlinear multi-target geolocation description function.

Example 20 includes the computer program product of Example 19, wherein performing the joint maximum likelihood optimization procedure includes, for each rank greater than one, computing association probabilities for each bearing measurement in the plurality of bearing measurements, each association probability representing probabilities of the bearing measurement being associated with individual targets of the current estimated number of targets, estimating the location of each target of the current estimated number of targets using a weighted least squares process, wherein weights used in the weighted least squares process correspond to a combination of the association probabilities and accuracy estimators for each bearing measurement, and seeding the search grid using the estimated location of each target of the current estimated number of targets.

Example 21 includes the computer program product of one of Examples 19 and 20, wherein performing the joint maximum likelihood optimization procedure includes, prior to solving the nonlinear multi-target geolocation description function, determining a plurality of seed points by applying a line of bearing walk function to the plurality of bearing measurements, and seeding the search grid with the plurality of seed points.

Example 22 includes the computer program product of any one of Examples 19-21, wherein applying the expectation maximization process includes applying a multi-survivor optimization process wherein at least two candidate solutions to the nonlinear multi-target geolocation description function are propagated from the rank into a next rank.

Example 23 includes the computer program product of any one of Examples 19-21, wherein the plurality of bearing measurements is a first plurality of bearing measurements collected over a first time interval, and wherein the process further comprises receiving a second plurality of bearing measurements collected over a second time interval that partially overlaps in time with the first time interval, and performing the joint maximum likelihood optimization procedure on the second plurality of bearing measurements.

Example 24 provides a method of estimating geolocations of a plurality of targets, the method comprising receiving, via a signal receiver, a first plurality of bearing measurements collected over a first time interval and a second plurality of bearing measurements collected over a second time interval that partially overlaps in time with the first time interval, establishing a first search grid based at least in part on the first plurality of bearing measurements, and establishing a second search grid based at least in part on the second plurality of bearing measurements, wherein individual bearing measurements in the first and second pluralities of bearing measurements representing respective lines of bearing between the signal receiver and respective targets of the plurality of targets. The method further comprises successively for each rank of a plurality of ranks, performing a joint maximum likelihood optimization procedure on the first plurality of bearing measurements over the first search grid to produce a corresponding first geolocation solution set for the rank, and performing the joint maximum likelihood optimization procedure on the second plurality of bearing measurements over the second search grid to produce a corresponding second geolocation solution set for each rank, such that, such that, after performing the joint maximum likelihood optimization procedures for the plurality of ranks, a plurality of first geolocation solutions sets and a plurality of second geolocation solution sets are produced, wherein each rank corresponds to a current estimated number of targets in the plurality of targets, and wherein performing the joint maximum likelihood optimization procedure includes solving a nonlinear multi-target geolocation description function for the estimated number of targets corresponding to the rank. The method further comprises, evaluating, based on a scoring function, the plurality of first geolocation solution sets and the plurality of second geolocation solution sets to estimate a true number of targets in the plurality of targets, based on the estimated true number of targets, selecting the corresponding geolocation solution set for the rank corresponding to the estimated true number of targets, and processing the selected corresponding geolocation solution set to produce a geolocation result that includes an estimated location of each target in the estimated true number of targets.

What is claimed is:

1. A method of estimating geolocations of a plurality of targets, the method comprising:
   receiving, via a signal receiver, a plurality of bearing measurements, individual bearing measurements representing respective lines of bearing between the signal receiver and respective targets of the plurality of targets;
   establishing a search grid based at least in part on the plurality of bearing measurements;
   successively for each rank of a plurality of ranks,
     performing a joint maximum likelihood optimization procedure on the plurality of bearing measurements over the search grid to produce a corresponding geolocation solution set for the rank, such that, after performing the joint maximum likelihood optimization procedure for the plurality of ranks, a plurality of geolocation solutions sets is produced,
     wherein each rank corresponds to a current estimated number of targets in the plurality of targets, and
     wherein performing the joint maximum likelihood optimization procedure includes solving a nonlinear multi-target geolocation description function for the estimated number of targets corresponding to the rank;
   evaluating, based on a scoring function, the plurality of geolocation solution sets to estimate a true number of targets in the plurality of targets;

based on the estimated true number of targets, selecting the corresponding geolocation solution set for the rank corresponding to the estimated true number of targets; and processing the selected corresponding geolocation solution set to produce a geolocation result that includes an estimated location of each target in the estimated true number of targets.

2. The method of claim 1, wherein performing the joint maximum likelihood optimization procedure includes applying an expectation maximization process to solve the nonlinear multi-target geolocation description function.

3. The method of claim 2, wherein applying an expectation maximization process includes applying a multi-survivor optimization process wherein at least two candidate solutions to the nonlinear multi-target geolocation description function are propagated from the rank into a next rank.

4. The method of claim 1, wherein performing the joint maximum likelihood optimization procedure includes, prior to solving the nonlinear multi-target geolocation description function:
determining a plurality of seed points by applying a line of bearing walk function to the plurality of bearing measurements; and
seeding the search grid with the plurality of seed points.

5. The method of claim 1, wherein performing the joint maximum likelihood optimization procedure includes:
computing association probabilities for each bearing measurement in the plurality of bearing measurements, each association probability representing probabilities of the bearing measurement being associated with respective individual targets of the current estimated number of targets.

6. The method of claim 5, wherein performing the joint maximum likelihood optimization procedure further includes:
estimating the location of each target of the current estimated number of targets using a weighted least squares process, wherein weights used in the weighted least squares process correspond to a combination of the association probabilities and accuracy estimators for each bearing measurement.

7. The method of claim 1, wherein receiving the plurality of bearing measurements includes:
moving the signal receiver along a trajectory; and
receiving, via the signal receiver, the plurality of bearing measurements at different collection points along the trajectory over time.

8. A target acquisition system comprising:
at least one signal receiver configured to collect a plurality of bearing measurements over a batch collection interval, individual bearing measurements of the plurality of bearing measurements representing a respective line of bearing between the at least one signal receiver and a respective target;
at least one processor; and
a data storage storing a plurality of instructions that when executed by the at least one processor configure the target acquisition system to perform a joint maximum likelihood target location estimation process including
establishing a search grid based on the plurality of bearing measurements,
successively for each rank of a plurality of ranks,
performing a joint maximum likelihood optimization procedure on the plurality of bearing measurements over the search grid to produce a corresponding geolocation solution set for the rank, such that, after performing the joint maximum likelihood optimization procedure for the plurality of ranks, a plurality of geolocation solutions sets is produced, wherein each rank corresponds to a current estimated number of targets in the plurality of targets, and wherein performing the joint maximum likelihood optimization procedure includes solving a nonlinear multi-target geolocation description function for the estimated number of targets associated with the rank,
evaluating, based on a scoring function, the plurality of geolocation solution sets to estimate a true number of targets in the plurality of targets,
based on the estimated true number of targets, selecting the corresponding geolocation solution set for the rank corresponding to the estimated true number of targets, and
processing the selected corresponding geolocation solution set to produce a geolocation result that includes an estimated location of each target in the estimated true number of targets of targets.

9. The target acquisition system of claim 8, further comprising:
a display device configured to display the geolocation result.

10. The target acquisition system of claim 8, wherein to perform the joint maximum likelihood optimization procedure, the data storage further includes instructions that when executed by the at least one processor configure the target acquisition system to apply an expectation maximization process to solve the nonlinear multi-target geolocation description function.

11. The target acquisition of claim 10, wherein to apply the expectation maximization process, the data storage further includes instructions that when executed by the at least one processor configure the target acquisition system to apply a multi-survivor optimization process wherein at least two candidate solutions to the nonlinear multi-target geolocation description function are propagated from the rank into a next rank.

12. The target acquisition system of claim 8, wherein to perform the joint maximum likelihood optimization procedure, the data storage further includes instructions that when executed by the at least one processor configure the target acquisition system to:
compute association probabilities for each bearing measurement in the plurality of bearing measurements, each association probability representing probabilities of the bearing measurement being associated with respective individual targets of the current estimated number of targets.

13. The target acquisition of claim 12, wherein to perform the joint maximum likelihood optimization procedure, the data storage further includes instructions that when executed by the at least one processor configure the target acquisition system to:
estimate the location of each target of the current estimated number of targets using a weighted least squares process, wherein weights used in the weighted least squares process correspond to a combination of the association probabilities and accuracy estimators for each bearing measurement.

14. The target acquisition of claim 8, wherein to perform the joint maximum likelihood optimization procedure, the data storage further includes instructions that when executed by the at least one processor configure the target acquisition system to, prior to solving the nonlinear multi-target geolocation description function:
- determine a plurality of seed points by applying a line of bearing walk function to the plurality of bearing measurements; and
- seed the search grid with the plurality of seed points.

15. The target acquisition of claim 8, wherein the at least one signal receiver is configured to move along a trajectory over time and to collect the plurality of bearing measurements from different collection points along the trajectory.

16. A computer program product including one or more machine-readable media encoded with instructions that when executed by one or more processors cause a process to be carried out for estimating geolocations of a plurality of targets, the process comprising:
- receiving, via a signal receiver, a plurality of bearing measurements, individual bearing measurements representing a respective line of bearing between the signal receiver and a respective target of the plurality of targets;
- establishing a search grid based at least in part on the plurality of bearing measurements;
- successively for each rank of a plurality of ranks,
  - performing a joint maximum likelihood optimization procedure on the plurality of bearing measurements over the search grid to produce a corresponding geolocation solution set for the rank, such that, after performing the joint maximum likelihood optimization procedure for the plurality of ranks, a plurality of geolocation solutions sets is produced,
  - wherein each rank corresponds to a current estimated number of targets in the plurality of targets, and
  - wherein performing the joint maximum likelihood optimization procedure includes solving a nonlinear multi-target geolocation description function for the current estimated number of targets;
- evaluating, based on a scoring function, the plurality of geolocation solution sets to estimate a true number of targets in the plurality of targets;
- based on the estimated true number of targets, selecting the corresponding geolocation solution set for the rank corresponding to the estimated true number of targets; and
- processing the selected corresponding geolocation solution set to produce a geolocation result that includes an estimated location of each target in the estimated true number of targets.

17. The computer program product of claim 16, wherein performing the joint maximum likelihood optimization procedure includes applying an expectation maximization process to solve the nonlinear multi-target geolocation description function.

18. The computer program product of claim 17, wherein performing the joint maximum likelihood optimization procedure includes, for each rank greater than one:
- computing association probabilities for each bearing measurement in the plurality of bearing measurements, each association probability representing probabilities of the bearing measurement being associated with individual targets of the current estimated number of targets;
- estimating the location of each target of the current estimated number of targets using a weighted least squares process, wherein weights used in the weighted least squares process correspond to a combination of the association probabilities and accuracy estimators for each bearing measurement; and
- seeding the search grid using the estimated location of each target of the current estimated number of targets.

19. The computer program product of claim 17, wherein performing the joint maximum likelihood optimization procedure includes, prior to solving the nonlinear multi-target geolocation description function:
- determining a plurality of seed points by applying a line of bearing walk function to the plurality of bearing measurements; and
- seeding the search grid with the plurality of seed points.

20. The computer program product of claim 17, wherein applying the expectation maximization process includes applying a multi-survivor optimization process wherein at least two candidate solutions to the nonlinear multi-target geolocation description function are propagated from the rank into a next rank.

* * * * *